(12) United States Patent
Huo et al.

(10) Patent No.: US 11,634,175 B2
(45) Date of Patent: Apr. 25, 2023

(54) DIP ANGLE-STEERING MEDIAN FILTERING METHOD BASED ON A NICHE DIFFERENTIAL EVOLUTION ALGORITHM

(71) Applicant: Institute of Geology and Geophysics, Chinese Academy of Sciences, Beijing (CN)

(72) Inventors: Shoudong Huo, Beijing (CN); Zhenghui Gao, Changchun (CN); Fuxing Han, Changchun (CN); Zhangqing Sun, Changchun (CN); Ping Yu, Changchun (CN); Liang Huang, Beijing (CN); Taikun Shi, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 117 days.

(21) Appl. No.: 17/467,289

(22) Filed: Sep. 6, 2021

(65) Prior Publication Data
US 2023/0009070 A1 Jan. 12, 2023

(30) Foreign Application Priority Data
Jul. 9, 2021 (CN) .......................... 202110780340.0

(51) Int. Cl.
*G01V 1/38* (2006.01)
*B62D 15/02* (2006.01)
*B62D 5/04* (2006.01)

(52) U.S. Cl.
CPC .......... *B62D 15/021* (2013.01); *B62D 5/049* (2013.01); *B62D 5/0475* (2013.01); *G01V 1/3826* (2013.01)

(58) Field of Classification Search
CPC .... B62D 15/021; B62D 5/0475; B62D 5/049; G01V 1/3826
See application file for complete search history.

(56) References Cited

U.S. PATENT DOCUMENTS 6,151,556 A * 11/2000 Allen ..................... G01V 1/364
702/18
9,429,668 B2 * 8/2016 Huo ........................ G01V 1/364

FOREIGN PATENT DOCUMENTS

| CN | 103778611 A | 5/2014 |
| CN | 107040269 A | 8/2017 |
| CN | 109756205 A | 5/2019 |

OTHER PUBLICATIONS

Huo et al., "Iterative dip-steering median filter", 2017, JOAP Publication, vol. 144, pp. 151-156. (Year: 2017).*

* cited by examiner

*Primary Examiner* — Elias Desta
(74) *Attorney, Agent, or Firm* — Nitin Kaushik

(57) ABSTRACT

A dip angle-steering median filtering method based on a niche differential evolution algorithm, comprising the following steps: dividing a data to be processed into a series of overlapping time-space windows; obtaining an event energy curve in a time-space window and obtaining an event position according to a local maximum value of the event energy curve; obtaining event dip angles and coherence values of the event dip angles through the niche differential evolution algorithm at the event position; filtering the event dip angles according to the event dip angles and the coherence values of the event dip angles; and performing a median filtering sequentially along a filtering dip angle. The disclosure can simultaneously obtain all dip angles of intersecting events and a true three-dimensional feature enable the present disclosure to obtain a better filtering effect.

8 Claims, 21 Drawing Sheets

DIP ANGLE-STEERING MEDIAN FILTERING METHOD BASED ON A NICHE DIFFERENTIAL EVOLUTION ALGORITHM

CROSS-REFERENCE TO RELATED APPLICATIONS

The application claims priority to Chinese patent application No. 202110780340.0, filed on Jul. 9, 2021, the entire contents of which are incorporated herein by reference.

TECHNICAL FIELD

The disclosure relates to the field of seismic data processing, in particular to a dip angle-steering median filtering method based on a niche differential evolution algorithm.

BACKGROUND

In the process of seismic exploration, the seismic data usually contains a regular noise and an irregular noise, including, the irregular noise is a stochastic noise. Seismic data often contains many stochastic noise, such as microseisms, background interference, etc. These noises are widely distributed and will seriously affect the signal-to-noise ratio of seismic data. At present, it is generally considered that a median filtering is a fast and efficient stochastic noise suppression method.

For seismic data, the event needs to be flattened before applying median filtering method. In the prior art, the flattening operation is achieved by estimating the event dip angle in a local time-space window, that is, the dip angle-steering median filtering method. Under general condition, one data position corresponds to only one dip angle value. However, in some complex geological environments, such as unconformities or faults, two or more events will intersect, resulting in multiple dip angle values at one data location.

The methods used to obtain the event dip angle in existing applications include a local slant stack method, a plane wave destructor (PWD) method and an iteration f-k method. The local slant stack method is to calculate the coherence values along different directions at the data point according to the coherence calculation formula and select the dip angle corresponding to the maximum coherence value for dip angle-steering median filtering. The PWD method first applies the implicit finite difference scheme to the local plane wave differential equation, and an infinite impulse response filter is used to approximate the phase shift operator to turn the local plane wave differential equation into a non-linear equation of the dip angle, and finally, the event dip angle can be worked out by an iterative inversion algorithm. The iterative f-k method first transforms the seismic data in a single time-space window into a radial Fourier domain in one iteration and then calculate a map of peak values by the summation of values along each radial direction, and finally the dip angle in the time-space domain is obtained according to the largest peak value selected in the radial Fourier domain.

At present, it is common that the event dip angle can be calculated under a general environment, while, for the calculation of the dip angles of the intersecting events in complex environment, there is still no good method.

SUMMARY

A dip angle-steering median filtering method based on a niche differential evolution algorithm to solve the above problems, comprising the following steps: S1: dividing a data to be processed into a series of overlapping time-space windows; S2: obtaining an event energy curve in a time-space window and obtaining an event position according to a local maximum value of the event energy curve; S3: obtaining event dip angles and coherence values of the event dip angles through the niche differential evolution algorithm at the event position; S4: filtering the event dip angles according to the event dip angles and the coherence values of the event dip angles; and S5: performing a median filtering sequentially along a filtering dip angle.

Preferably comprising S6: storing a median filtering data in the time-space window.

Preferably comprising S7: determining whether a data to be analyzed in each the time-space window has been processed; if the data to be analyzed in each the time-space window has been processed, returning to S2 and the steps after S2; and if the data to be analyzed in each the time-space window has not been processed, accumulating the median filtering data in all time-space windows.

Preferably, obtaining the event energy curve in the time-space window in S2, comprising: applying a formula $E(t, x_0, y_0) = \sum_{j=-H/4}^{H/4} \sum_{i=-H/4}^{H/4} \sum_{k=-T}^{T} |d(t+k, i+x_0, j+y_0)| \varphi(i,j) \exp(-\phi k^2)$, and determining the local maximum value of the event energy curve, and identifying the event position according to the local maximum value of the event energy curve; wherein, if $\sqrt{i^2+j^2} \leq H/4$, $$\varphi(i,j) = \sin\left(\frac{\pi}{2}\left(1 - \frac{\sqrt{i^2+j^2}}{H/4}\right)\right)^q;$$

otherwise, $\varphi(i,j)=0$; E is event energy of the time-space window, t is a calculation time position, H is a space width of the time-space window, d is the data to be analyzed, T is a half width of an energy calculation range, $\phi$ is a constant greater than or equal to 1, a value of $x_0$ is $$\frac{H}{4}, \frac{H}{2} \text{ or } \frac{3H}{4}$$

and a value of $y_0$ is $$\frac{H}{4}, \frac{H}{2} \text{ or } \frac{3H}{4};$$

q is a constant greater than or equal to 1.

Preferably, the niche differential evolution algorithm, comprising: a neighborhood-based crowding differential evolution algorithm, a hill-valley detection function and a Nelder-Mead simplex algorithm; and the neighborhood-based crowding differential evolution algorithm is used to drive local solutions moving towards the respective local optima; the hill-valley detection function is used to obtain the local excellent solutions from the local solutions; the Nelder-Mead simplex algorithm is used to improve the accuracy of the local excellent solutions; and the neighborhood-based crowding differential evolution algorithm, comprising the following steps:

S31: generating N initial units randomly; S32: browsing each of the initial units and finding the most similar m units to form a subpopulation; S33: using a mutation and a crossover operation of the differential evolution algorithm in the subpopulation, and generating an experimental sub-unit; S34: calculating the Euclidean distance of the experimental sub-unit and other units in an entire subpopulation; S35: comparing the coherence value of the experimental sub-unit with that of the unit with the closet Euclidean distance, if the coherence value of the experimental sub-unit is smaller, then replacing the unit with the closet Euclidean distance with the experimental sub-unit; S36: repeating S32-S35 M times until the neighborhood-based crowding differential evolution algorithm terminates, and M is a maximum number of an iteration.

Preferably, wherein, the hill-valley detection function is used to determine whether any two local solutions belong to a same niche, comprising the following steps: S37: sampling between any two local solutions, and obtaining the coherence values of the interior dip angle samples between the two local solutions; S38: if the coherence value of any of the interior dip angle samples is greater than a coherence value of the two local solutions, and then determining the two local solutions belong to different niches, and if the coherence value of any of the interior dip angle samples is smaller than the coherence value of the two local solutions, and then determining the two local solutions belong to a same niche; S39: obtaining the local excellent solutions from the local solutions.

Preferably, the Nelder-Mead simplex algorithm is used to improve the accuracy of the local excellent solutions, comprising the following steps: S310: constructing a simplex with n+1 vertices around a single local excellent solution, n is the dimension of the single local excellent solution; sorting and relabeling the n+1 vertices as $x_1, x_2, \ldots, x_{n+1}$, and letting $f(x_1) \leq f(x_2) \leq \ldots \leq f(x_{n+1})$; since the goal is to minimize f, therefore, in an example of the present disclosure, $x_1$ is a best vertex and $x_{n+1}$ is a worst vertex. S311: according to $x_r=x_o+\rho(x_o-x_{n+1})$, calculating a reflection point $x_r$, in the formula, $x_o$ is a centroid of n best points, $$x_o = \frac{\sum_{i=1}^{n} x_i}{n};$$

calculating $f(x_r)$, if $f(x_1) \leq f(x_r) < f(x_n)$, and then replacing $x_{n+1}$ with the reflection point $x_r$ and going to S316. S312: if $f(x_r) < f(x_1)$, according to $x_e = x_o + \chi(x_r - x_o)$, calculating an expansion point $x_e$ and $f(x_e)$; if $f(x_e) < f(x_r)$, replacing $x_{n+1}$ with $x_e$ and going to S316, otherwise, replacing $x_{n+1}$ with $x_r$ and going to S316; S313: if $f(x_n) \leq f(x_r) < f(x_{n+1})$, performing an outside contraction, according to $x_{oc} = x_o + \gamma(x_r - x_o)$, calculating an outside contraction point $x_{oc}$ and $f(x_{oc})$; if $f(x_{oc}) \leq f(x_r)$, replacing $x_{n+1}$ with $x_{oc}$ and going to S315; S314: if $f(x_r) \geq f(x_{n+1})$, performing an inside contraction, according to $x_{ic} = x_o + \gamma(x_{n+1} - x_o)$, calculating an inside contraction point $x_{ic}$ and $f(x_{ic})$; if $f(x_{ic}) \leq f(x_{n+1})$, replacing $x_{n+1}$ with $x_{ic}$ and going to S316, otherwise, going to S315; S315: calculating $f(x'_i)$ at n new points $x'_i = x_1 + \gamma(x_i - x_1)$, i=2, ..., n+1, and replacing vertexes $x_2, \ldots, x_{n+1}$ with $x'_2, \ldots, x'_{n+1}$; S316: sorting and relabeling the n+1 vertices of a new simplex as $x_1, x_2, \ldots, x_{n+1}$, $f(x_1) \leq f(x_2) \leq \ldots \leq f(x_{n+1})$, if $$\left[ \sum_{i=1}^{n+1} \frac{(f(x_i) - f(x_o))^2}{n+1} \right]^{\frac{1}{2}} < \varepsilon \; (\varepsilon > 0)$$

is a predetermined threshold), or achieving the maximum number of an iteration, and then stopping, otherwise, going to S311.

Preferably, in S4, filtering the event dip angles according to the event dip angles and the coherence values of the event dip angles, comprising: S41: setting an event dip angle threshold $\delta$; S42: for k obtained event dip angles, $p_1, p_2, \ldots, p_k$ and the corresponding coherence values of the event dip angles, $f_1, f_2, \ldots, f_k$, and for any two event dip angles $p_o$ and $p_q$, calculating $\|p_i - p_j\|_2$; S43: removing the event dip angle with a larger coherence value if $\|p_i - p_j\|_2 < \delta$, wherein, o and q are integers greater than 0, and o≠q, o≤k, and q≤k.

The dip angle-steering median filtering method based on a niche differential evolution algorithm does not need to calculate the apparent dip angle separately along the two spatial directions of the three-dimensional data, but directly obtains the true three-dimensional dip angle. Due to the randomness and intelligence of the niche differential evolution algorithm, compared to the local slant stack algorithm (in the case of three dimensions, the local slant stack algorithm should require uniform sampling along two spatial directions), niche differential evolution algorithm can obtain all the dip angles of intersecting events while obtaining higher computational efficiency. The niche differential evolution algorithm's ability to simultaneously obtain all the dip angles of intersecting events and the feature of the true three-dimension make it possible to obtain a better filtering effect.

BRIEF DESCRIPTION OF DRAWINGS

FIG. 7A is a dip angle-steering median filtering result based on the iterative f-k method; FIG. 7B is a dip angle-steering filtering results based on the niche differential evolution algorithm; FIG. 7C is a residual of the FIG. 7A and the noise data; FIG. 7D is a residual of the FIG. 7B and the noise data;

FIG. 8A is a dip angle-steering median filtering result based on the iterative f-k method; FIG. 8B is a dip angle-steering filtering results based on the niche differential evolution algorithm; FIG. 8C is a residual of the FIG. 8A and the noise data; FIG. 8D is a residual of the FIG. 8B and the noise data;

FIG. 9A is a dip angle-steering median filtering result based on the iterative f-k method; FIG. 9B is a dip angle-steering filtering results based on the niche differential evolution algorithm; FIG. 9C is a residual of the FIG. 9A and the noise data; FIG. 9D is a residual of the FIG. 9B and the noise data.

DETAILED DESCRIPTION OF THE EMBODIMENTS

Figure 1:
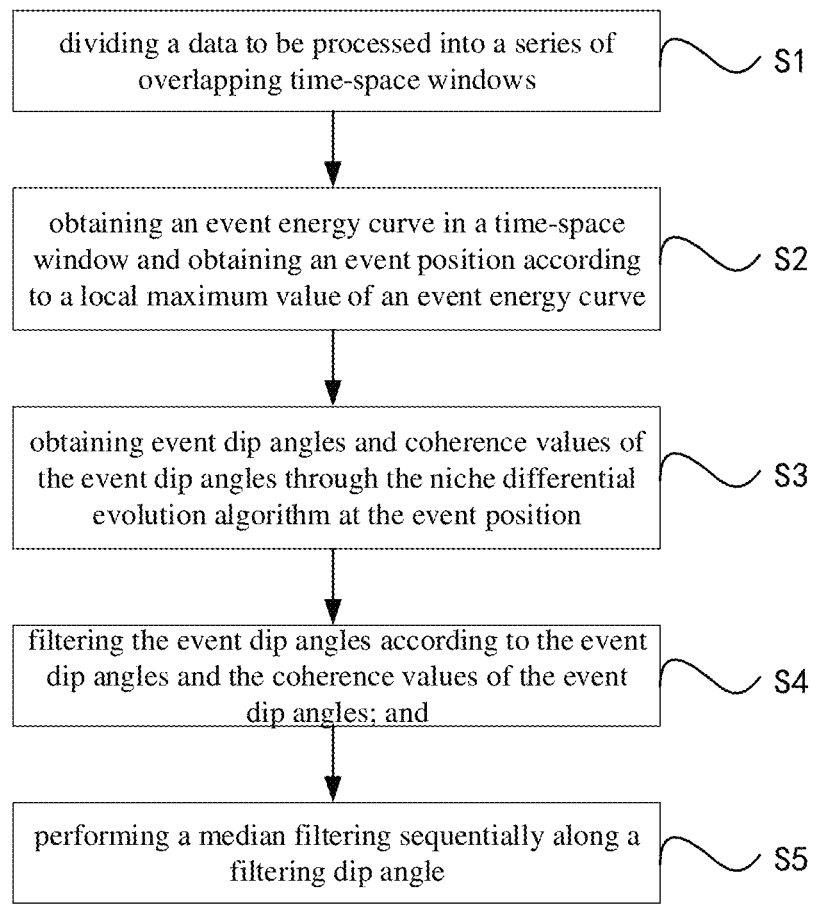
FIG. 1 is the one of the process diagrams of the dip angle-steering median filtering method based on a niche differential evolution algorithm.

In order to make the purpose, technical scheme and advantages of the disclosure clearer, the technical scheme of the disclosure will be clearly and completely described in the following combining with the appended drawings of the disclosure. Obviously, the embodiments described are partial embodiments and not all embodiments of the disclosure. Based on the embodiments in the disclosure, all other embodiments obtained by ordinary technicians in the art without creative work shall fall within the protection scope of the present disclosure.

The inventor of the present disclosure found in the process of studying the local slant stack method, the PWD method and the iterative f-k method that the local slant stack method can only calculate the dip angle direction corresponding to the maximum coherence value when dealing with the intersecting events. In addition, in the three-dimensional case, the local slant stack method needs to sample uniformly along two spatial directions. If the number of sampling points in each direction is set to 100, then $10^4$ coherence calculations are required, which will seriously affect the calculation efficiency. While the equation is underdetermined when calculating the dip angles of the intersecting events by PWD method, and the final solution depends heavily on the initial values and the regularization conditions. The PWD method is sensitive to strong noise, but strong noise is widespread in actual data, which makes it difficult to accurately obtain the actual dip angle of the three-dimensional data by using the two-dimensional PWD method to calculate along the two spatial directions of the three-dimensional data. For the iterative f-k method, although the number of intersecting events is not limited, the number of intersecting events (the number of iterations) should be preset. And due to the iterative method, it will inevitably affect the calculation accuracy of the event dip angle at the back of the order. Since the three-dimensional data is limited by the f-k transformation, the two spatial directions that along the three-dimensional data is adopted to calculate the apparent dip angles separately, which makes it difficult to accurately obtain the actual dip angle of the three-dimensional data, affecting the filtering effect of the dip angle-steering median filtering.

In the process of research, the inventor of the present disclosure observed the coherence curve (two-dimensional) and curved surface (three-dimensional) of intersecting events along different dip angles directions, and found that they are multimodal, and local extremum accurately corresponds to the dip angle of the corresponding event. Therefore, based on the multimodality shown by the coherence of intersecting events along different dip angle directions, the present disclosure creatively transforms the calculation of the dip angles of the intersecting events into a multimodal optimization in the field of intelligent optimization, calculates the dip angles of the intersecting events by the niche differential evolution algorithm, and then apply the dip angles of the intersecting events to dip angle-steering median filtering. The niche differential evolution algorithm can properly search over multimodal fitness landscapes by driving subsets of a population towards different areas in the search space and promoting distributed convergence to multiple peaks at the same time, finally simultaneously obtaining dip angles corresponds to intersecting events.

In addition, for three-dimensional seismic data, the niche differential evolution algorithm does not need to calculate the apparent dip angle separately along the two spatial directions of the three-dimensional data, but directly obtains the true three-dimensional dip angle. Due to the randomness and intelligence of the niche differential evolution algorithm, compared to the local slant stack algorithm (in the case of three dimensions, the local slant stack algorithm should require uniform sampling along two spatial directions), niche differential evolution algorithm can obtain all the dip angles of intersecting events while obtaining higher computational efficiency. The niche differential evolution algorithm's ability to simultaneously obtain all the dip angles of intersecting events and the feature of the true three-dimension make it possible to obtain a better filtering effect.

Figure 2:
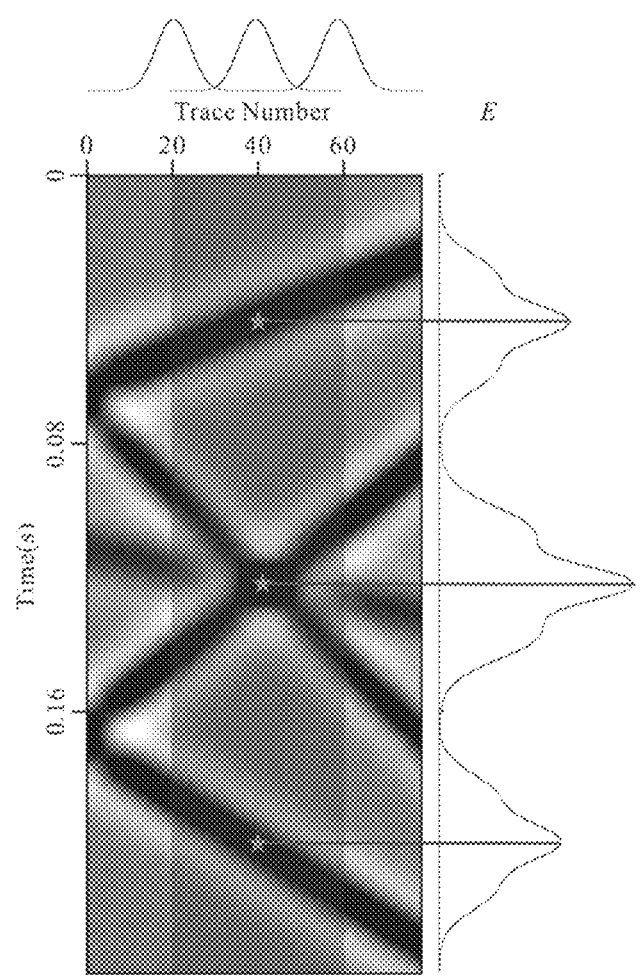
FIG. 2 is a schematic diagram of the identification of the position for seismic event in the time-space window of the dip angle-steering median filtering method based on the niche differential evolution algorithm.
Figure 3:
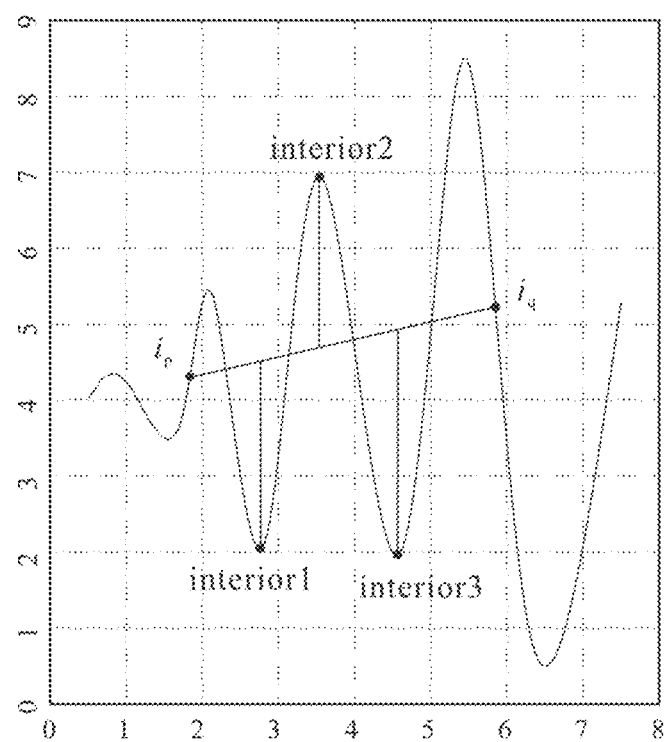
FIG. 3 is a scheme diagram of the hill-valley detection function of the dip angle-steering median filtering method based on the niche differential evolution algorithm.

FIG. 1-FIG. 3 describe a dip angle-steering median filtering method based on a niche differential evolution algorithm, comprising S1-S5:

S1: dividing a data to be processed into a series of overlapping time-space windows;

in an embodiment of the present disclosure, the data to be processed is a seismic data, further, the seismic data is a two-dimensional seismic data or a three-dimensional seismic data. A time-space window is a sampling window along the time direction and the space direction.

in an embodiment of the present disclosure, when dividing the data to be processed into the overlapping time-space windows, both time and space can be overlapped by 50%, and in other embodiments, other overlapping ways can also be chosen.

S2: obtaining an event energy curve in a time-space window and obtaining an event position according to a local maximum value of an event energy curve.

In the case of two dimension, the formula to calculate the event energy is:

$$E(t, x_0) = \sum_{i=-\frac{H}{4}}^{\frac{H}{4}} \sum_{k=-T}^{T} |d(t+k, i+x_0)| \sin\left(\frac{\pi}{2}\left(1 - \frac{i}{\frac{H}{4}}\right)\right)^q \exp(-\phi k^2)$$

wherein, t is a calculation time position, H is a space width of the time-space window, the value of $x_0$ is $$\frac{H}{4}, \frac{H}{2} \text{ or } \frac{3H}{4},$$

E is an energy of the calculation position, d is the data to be processed, T is a half width of an energy calculation range, |*| means to take the absolute value of the data, $\phi$ is a constant greater than or equal to 1. Taking 4 in an embodiment of the present disclosure, and q is a constant greater than or equal to 1, and taking 10 in an embodiment of the present disclosure.

Obtaining the event position according to the local maximum value of the event energy curve. FIG. 2 is a schematic diagram of the identification of event in a certain time-space window when $x_0$ takes $$\frac{H}{2}$$

in the two-dimensional situation, wherein, the seismic data is composed of five events, and the events are intersecting. The curve on the right of the FIG. 2 is the energy curve obtained according to the formula for calculating the event energy at $$\frac{H}{2}.$$

The three-pointed star is the local maximum value of the identified energy curve, that is, the event position.

In the case of three dimension, the formula to calculate the event energy is: $E(t,x_0,y_0)=\Sigma_{j=-H/4}^{H/4}\Sigma_{i=-H/4}^{H/4}\Sigma_{k=-T}^{T}|d(t+k,i+x_0,j+y_0)|\varphi(i,j)\exp(-\phi k^2)$
wherein, if $$\sqrt{i^2+j^2} \le H/4, \varphi(i,j) = \sin(\frac{\pi}{2}(1-\frac{\sqrt{i^2+j^2}}{H/4}))^q;$$

otherwise, $\varphi(i,j)=0$;

E is event energy of the time-space window, t is a calculation time position, H is a space width of the time-space window, d is the data to be analyzed, T is a half width of an energy calculation range, $\phi$ is a constant greater than or equal to 1, a value of $x_0$ is $$\frac{H}{4}, \frac{H}{2} \text{ or } \frac{3H}{4}$$

and a value of $y_0$ is $$\frac{H}{4}, \frac{H}{2} \text{ or } \frac{3H}{4},$$

$x_0$, $y_0$ is the calculation position, that is, the middle three points of the quarter point in the two-dimensional case, and the nine points on the plane in the three-dimensional case, and q is a constant greater than or equal to 1, and taking 10 in an embodiment of the present disclosure.

S3: obtaining event dip angles and coherence values of the event dip angles through the niche differential evolution algorithm at the event position.

The niche differential evolution algorithm includes the neighborhood-based crowding differential evolution algorithm, the hill-valley detection function and the Nelder-Mead simplex algorithm.

The neighborhood-based crowding differential evolution algorithm is used to drive local solutions moving towards the respective local optima; the hill-valley detection function is used to obtain the local excellent solutions from the local solutions; and the Nelder-Mead simplex algorithm is used to improve the accuracy of the local excellent solutions.

The neighborhood-based crowding differential evolution algorithm, comprising the following steps:

S31: generating N initial units randomly.

The initial individual is a certain dip angle population, representing a sum of all dip angles, and the dip angle is the solution of the optimization algorithm.

S32: browsing each of the initial units.

Finding the most similar m units to form a subpopulation. In the embodiment, the most similar unit is a unit closest to the distance (Euclidean distance) between the two dip angles.

S33: using a mutation and a crossover operation of the differential evolution algorithm in the subpopulation, and generating an experimental sub-unit.

In the embodiment, the mutation formula is:

$$v_i^{(G)} = x_{r_1}^{(G)} + F \cdot (x_{r_2}^{(G)} - x_{r_3}^{(G)})$$

in the above formula, $v_i=[v_{i,1}, v_{i,2}, \ldots, v_{i,D}]$ is mutation vector (D is the dimension of solution), G is iteration times, $r_1$, $r_2$ and $r_3$ are three mutually exclusive random indexes between [1, m], indexes of $r_1$, $r_2$ and $r_3$ are different from that of the objective vector $x_i^{(G)}$, $F \in [0,2]$ is a scaling vector.

The crossover formula is:

$$\mu_{i,j}^{(G+1)} = \begin{cases} v_{i,j}^{(G+1)} & \text{if rand}_j \le CR \text{ or } j = k \\ x_{i,j}^{(G+1)} & \text{otherwise} \end{cases} \quad (6)$$

wherein, $CR \in [0,1]$ is a control parameter, $rand_j$ is a random number uniformly distributed in the interval [0, 1], k is a natural number randomly selected among [1, D], using k to ensure that $\mu_i^{(G)}$ gets at least one component from $v_i^{(G)}$.

S34: calculating a Euclidean distance of the experimental sub-unit and other units in the entire population.

S35: comparing the coherence value of the experimental sub-unit with that of the unit with the closet Euclidean distance, if the coherence value of the experimental sub-unit is smaller, then replacing the unit with the closet Euclidean distance with the experimental sub-unit.

S36: repeating S32-S35 M times until the neighborhood-based crowding differential evolution algorithm terminates, and M is a maximum number of an iteration.

In the embodiment, the number of the subpopulation is 25, and the maximum of iteration N is 25. For the calculation of the dip angles of the intersecting events, the neighborhood-based crowding differential evolution algorithm can ensure that there is a solution near each optimal solution.

As shown in FIG. 3, the hill-valley detection function is used to determine whether any two local solutions belong to a same niche, comprising the following steps:

S37: sampling between any two local solutions, and obtaining the coherence values of the interior dip angle samples between the two local solutions.

S38: if the coherence value of any of the interior dip angle samples is greater than a coherence value of the two local solutions, and then determining the two local solutions belong to different niches;

if the coherence value of any of the interior dip angle samples is smaller than the coherence value of the two local solutions, and then determining the two local solutions belong to a same niche.

S39: obtaining the local excellent solutions from the local solutions.

In the embodiment, the Nelder-Mead simplex algorithm is used to continue the optimization of the local excellent solutions obtained in steps, and the Nelder-Mead simplex algorithm is one of the most popular derivative-free nonlinear optimization method. The simplex is a geometric shape composed of n+1 vertices $(x_1, x_2, \ldots, x_{n+1})$ in n-dimensional space and their function values. Through reflection, expansion, contraction and shrinkage operations, the selected excellent solutions can be deterministically converged to the corresponding local optima. The Nelder-Mead simplex algorithm maintains a non-degenerate simplex during each iteration. The Nelder-Mead simplex algorithm needs to set four constant parameters, that is, reflection coefficient ρ (ρ>0), expansion coefficient χ (χ>1), contraction coefficient γ (0<γ<1) and shrinkage coefficient σ (0<σ<1). Further, the Nelder-Mead simplex algorithm is used to improve the accuracy of the local excellent solutions, comprising the following steps:

S310: constructing a simplex with n+1 vertices around a single local excellent solution, n is the dimension of the single local excellent solution; sorting and relabeling the n+1 vertices as $x_1, x_2, \ldots, x_{n+1}$, and letting $f(x_1) \leq f(x_2) \leq \ldots \leq f(x_{n+1})$; since the goal is to minimize f, therefore, in an example of the present disclosure, $x_1$ is a best vertex and $x_{n+1}$ is a worst vertex.

S311: according to: $x_r = x_o + \rho(x_o - x_{n+1})$, calculating a reflection point $x_r$, in the formula, $x_o$ is a centroid of n best points, $$x_o = \frac{\sum_{i=1}^{n} x_i}{n};$$

calculating $f(x_r)$, if $f(x_1) \leq f(x_r) < f(x_n)$, and then replacing $x_{n+1}$ with the reflection point $x_r$ and going to S316.

S312: if $f(x_r) < f(x_1)$, according to $x_e = x_o + \chi(x_r - x_o)$, calculating an expansion point $x_e$ and $f(x_e)$; if $f(x_e) < f(x_r)$, and replacing $x_{n+1}$ with $x_e$ and going to S316, otherwise, replacing $x_{n+1}$ with $x_r$ and going to S316.

S313: if $f(x_n) \leq f(x_r) < f(x_{n+1})$, performing an outside contraction, according to $x_{oc} = x_o + \gamma(x_r - x_o)$, calculating an outside contraction point $x_{oc}$ and $f(x_{oc})$; if $f(x_{oc}) \leq f(x_r)$, replacing $x_{n+1}$ with $x_{oc}$ and going to S315.

S314: if $f(x_r) \geq f(x_{n+1})$, performing an inside contraction, according to $x_{ic} = x_o + \gamma(x_{n+1} - x_o)$, calculating an inside contraction point $x_{ic}$ and $f(x_{ic})$; if $f(x_{ic}) \leq f(x_{n+1})$, replacing $x_{n+1}$ with $x_{ic}$ and going to S316, otherwise, going to S315.

S315: calculating $f(x'_i)$ at n new points $x'_i = x_1 + \gamma(x_i - x_1)$, i=2, . . . , n+1, and replacing vertexes $x_2, \ldots, x_{n+1}$ with $x'_2, \ldots, x'_{n+1}$.

S316: sorting and relabeling the n+1 vertices of a new simplex as $x_1, x_2, \ldots, x_{n+1}$, $f(x_1) \leq f(x_2) \leq \ldots \leq f(x_{n+1})$, if $$\left[ \sum_{i=1}^{n+1} \frac{(f(x_i) - f(x_o))^2}{n+1} \right]^{\frac{1}{2}} < \varepsilon \ (\varepsilon > 0)$$

is a predetermined threshold), or achieving the maximum number of an iteration, and then stopping, otherwise, going to S311.

Stability, efficiency and accuracy of the algorithm need comprehensively considering in the engineering applications. There is no doubt that in the application of seismic data processing, a stable and high-accuracy calculation of the dip angles of the intersecting events is required. However, a fine search in a stable and high-accuracy calculation means more function calls, which will greatly affect calculation efficiency. When only one niching method is fully adopted, this problem is enhanced owing to intrinsic randomness. The present disclosure cascades the hill-valley detection function and the Nelder-Mead simplex algorithm with the neighborhood-based crowding differential evolution algorithm, avoiding the fine search caused by the inherent randomness of the neighborhood-based crowding differential evolution algorithm.

S4: filtering the event dip angles according to the event dip angles and the coherence values of the event dip angles, comprising the following steps:

S41: setting an event dip angle threshold δ;

S42: for k obtained event dip angles, $p_1, p_2, \ldots, p_k$ and the corresponding coherence values of the event dip angles, $f_1, f_2, \ldots, f_k$, and for any two event dip angles $p_o$ and $p_q$, calculating $\|p_i - p_j\|_2$;

S43: removing the event dip angle with a larger coherence value if $\|p_i - p_j\|_2 < \delta$;

wherein, o and q are integers greater than 0, and o≠q, o≤k, and q≤k.

S5: performing a median filtering sequentially along a filtering dip angle;

Preferably, in the embodiment, the dip angle-steering median filtering method based on a niche differential evolution algorithm; further comprising the following steps:

S6: storing a median filtering data in the time-space window.

S7: determining whether a data to be processed in each the time-space window has been processed;

if the data to be processed in each the time-space window has been processed, returning to S2 and the steps after S2;

if the data to be analyzed in each the time-space window has not been processed, accumulating the median filtering data in all time-space windows.

Figure 4:
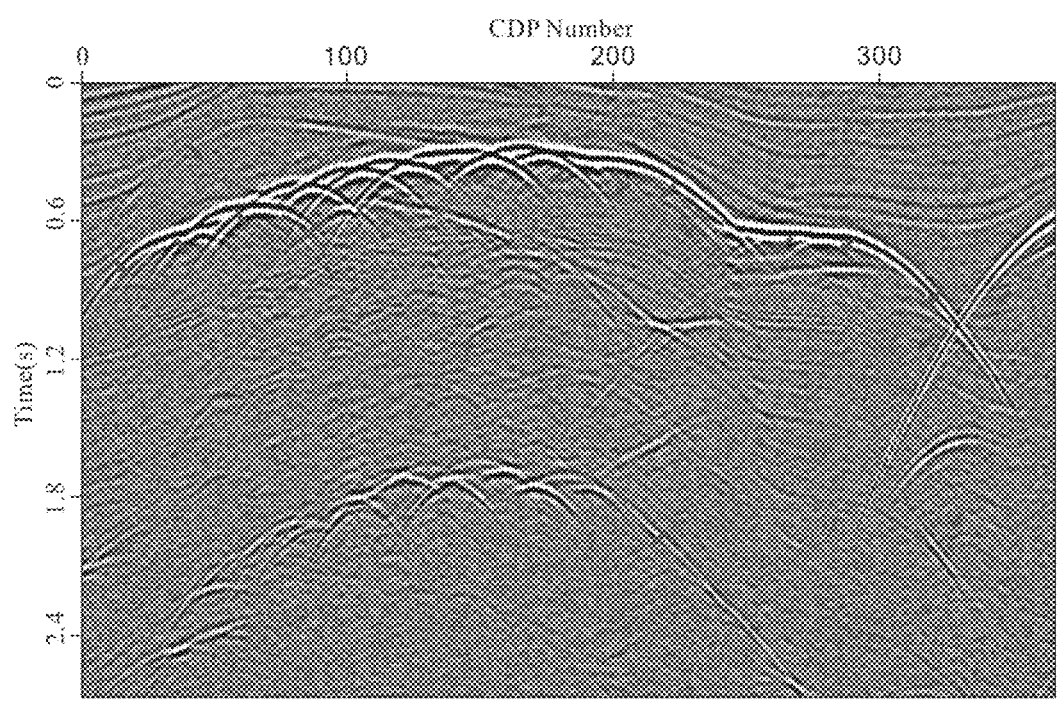
FIG. 4 is a two-dimensional Gaussian white noise seismic data with a signal-to-noise ratio of 15 dB provided by the present disclosure.
Figure 5A:
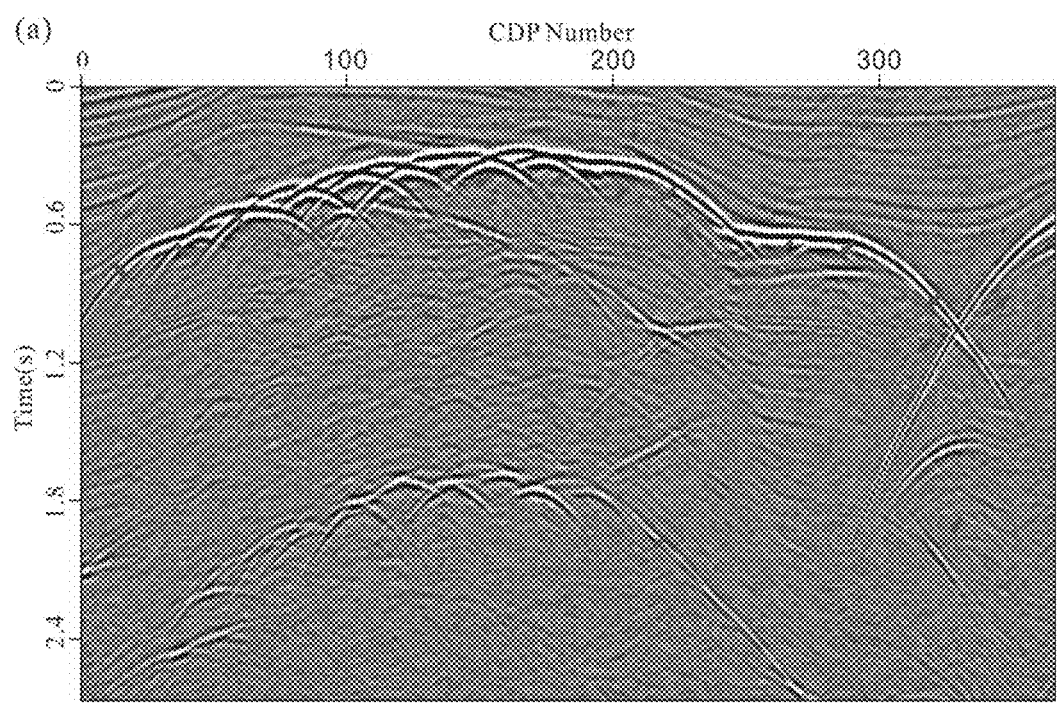
FIG. 5A is a dip angle-steering median filtering result based on the iterative f-k method provided by the present disclosure.
Figure 5B:
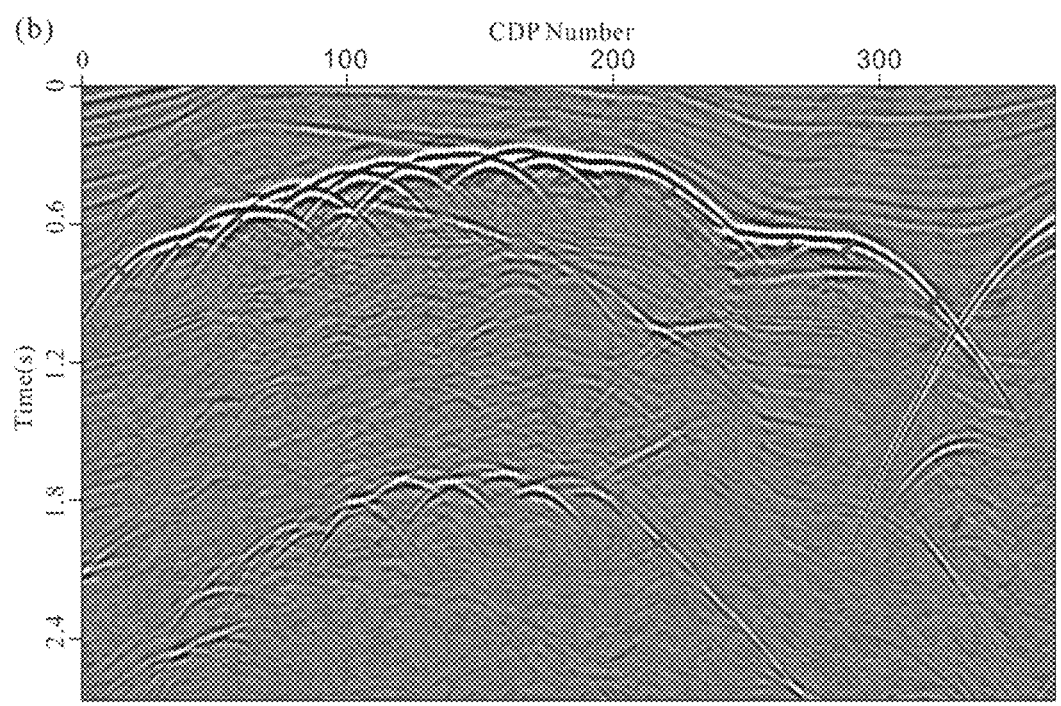
FIG. 5B is a dip angle-steering median filtering results based on the niche differential evolution algorithm.
Figure 5C:
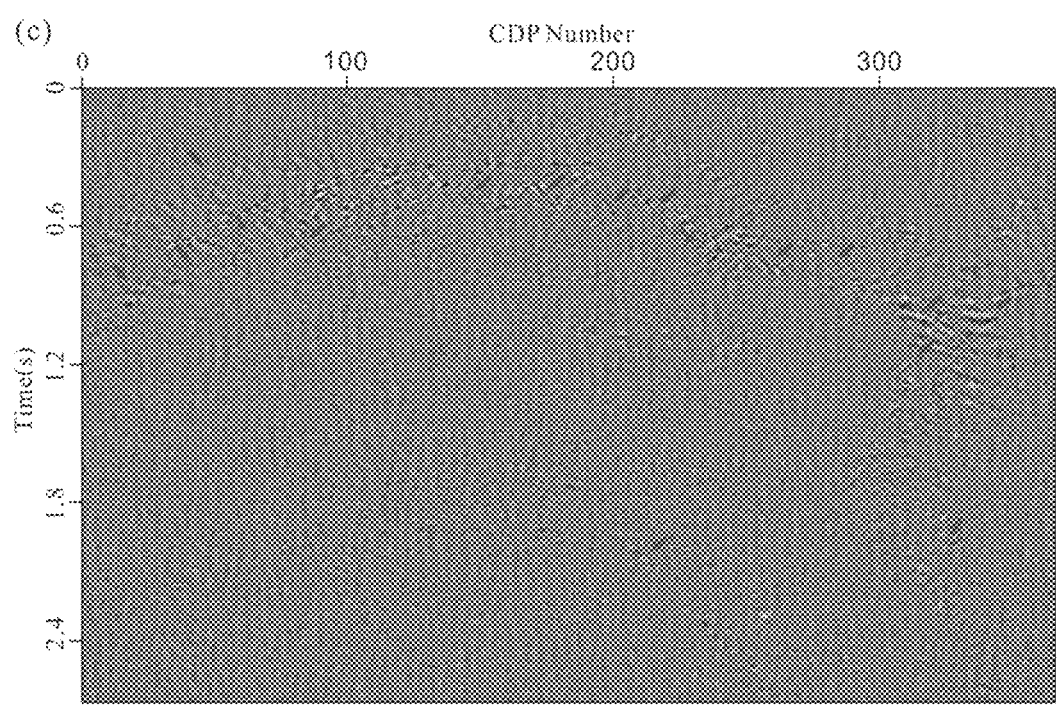
FIG. 5C is a residual of the FIG. 5A and the noise data.
Figure 5D:
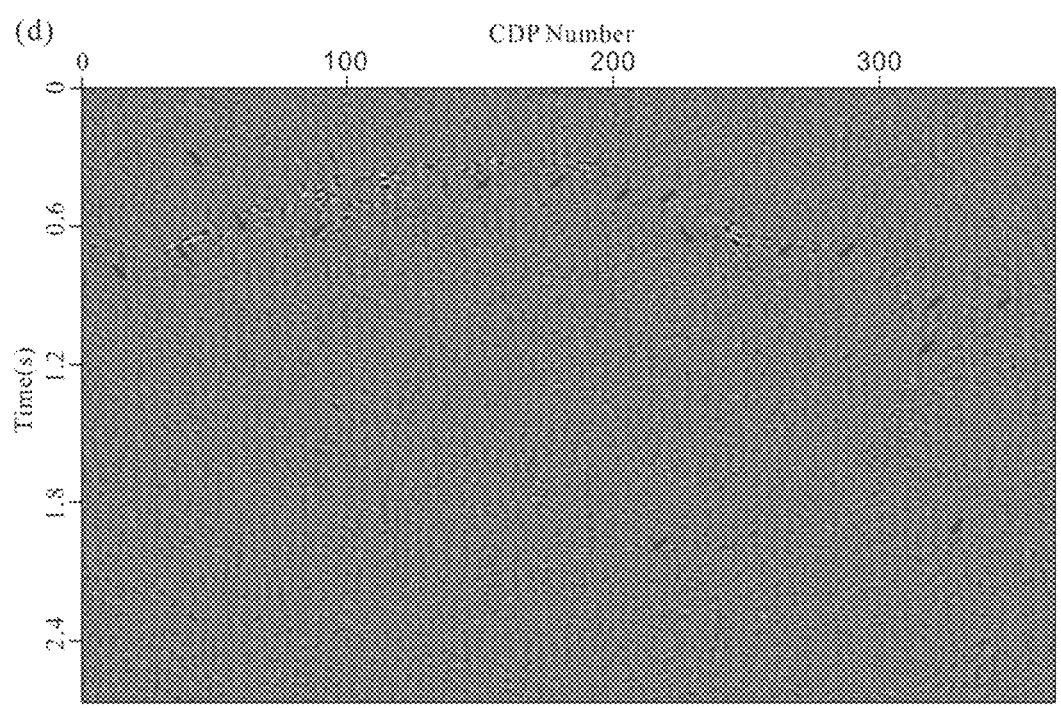
FIG. 5D is a residual of the FIG. 5B and the noise data.

FIG. 4 is a two-dimensional Gaussian white noise seismic data with a signal-to-noise ratio of 15 dB, but the wavefields of the two-dimensional Gaussian white noise seismic data are complex, and the intersecting phenomenon of the events is serious. The present disclosure respectively uses the dip angle-steering median filter based on the niche differential evolution algorithm and the dip angle-steering median filter based on the iterative f-k method to suppress random noise, and compares the two algorithms. FIG. 5A is a dip angle-steering median filtering result based on the iterative f-k method. FIG. 5B is a dip angle-steering median filtering results based on the niche differential evolution algorithm. FIG. 5C is the residual of the FIG. 5A and the noise data. FIG. 5D is the residual of the FIG. 5B and the noise data.

From the filtering results and residual data, it can be seen that the dip angle-steering median filtering based on the niche differential evolution algorithm can protect the event well, and the residual results are almost incoherent. The dip angle-steering median filtering based on the iterative f-k method is not effective for the filtering of the intersecting events, and the events with weak energy will be leaked. Moreover, due to the inaccurate estimation of the local dip angle by the iterative f-k method, some abnormal amplitudes will be introduced.

Figure 6:
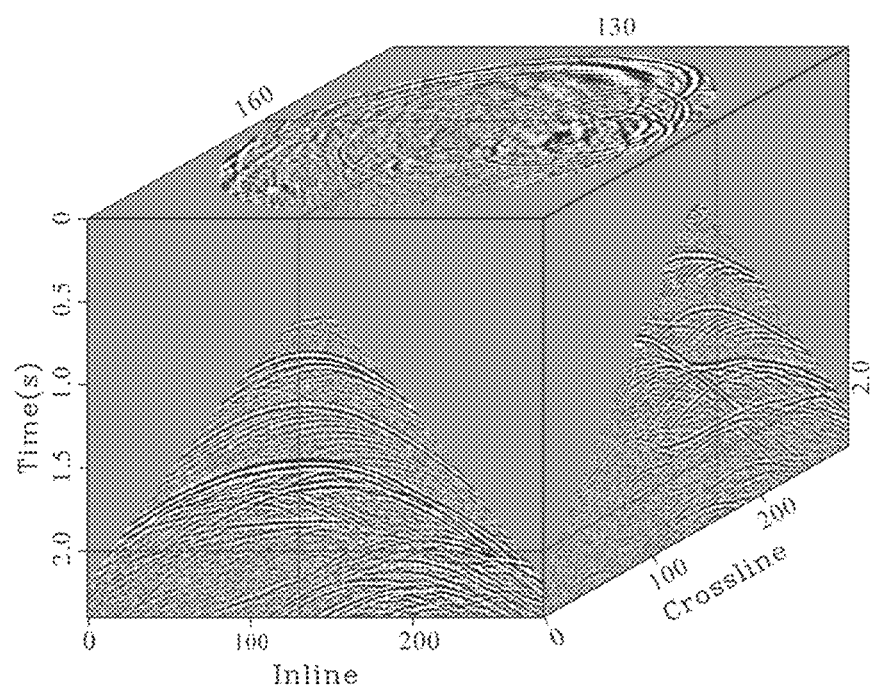
FIG. 6 is a three-dimensional Gaussian white noise seismic data with a signal-to-noise ration of 20 dB provided by the present disclosure.
Figure 7A:
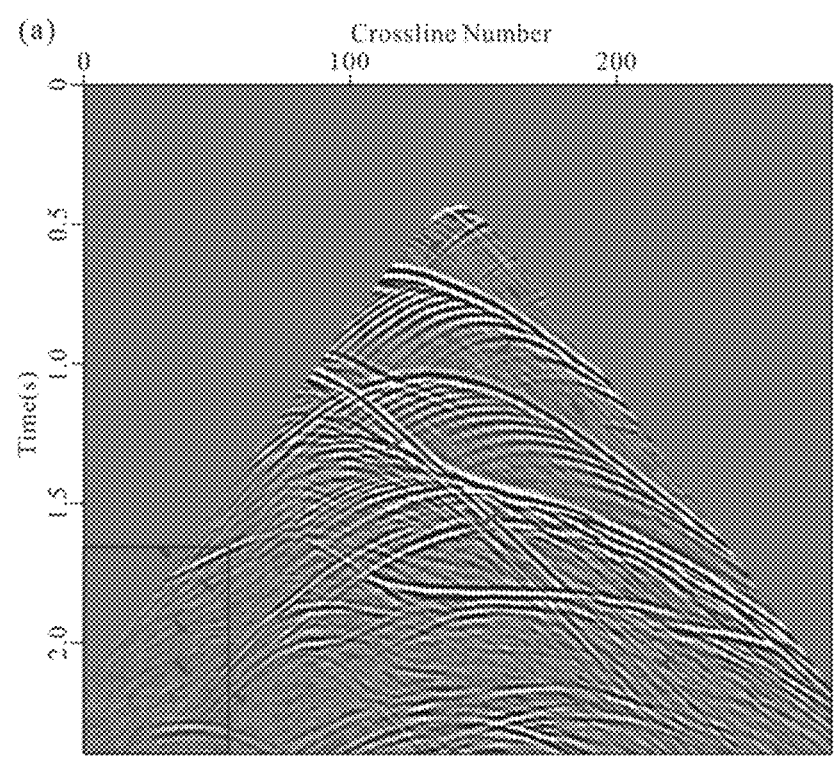
FIG. 7A, FIG. 7B, FIG. 7C, FIG. 7D are the data slice at position where the inline number is 130.
Figure 7B:
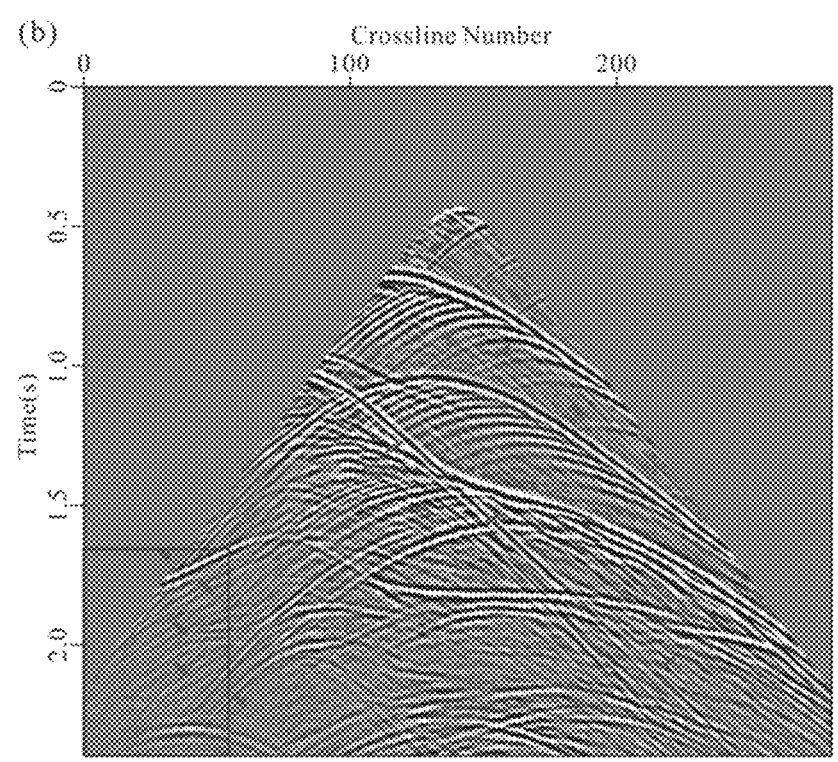
Figure 7C:
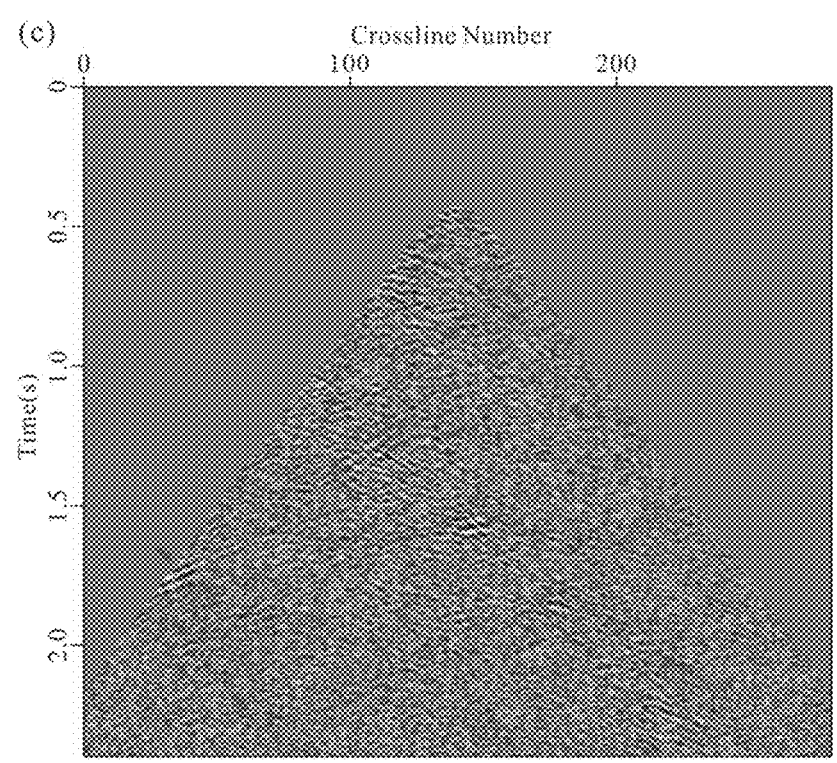
Figure 7D:
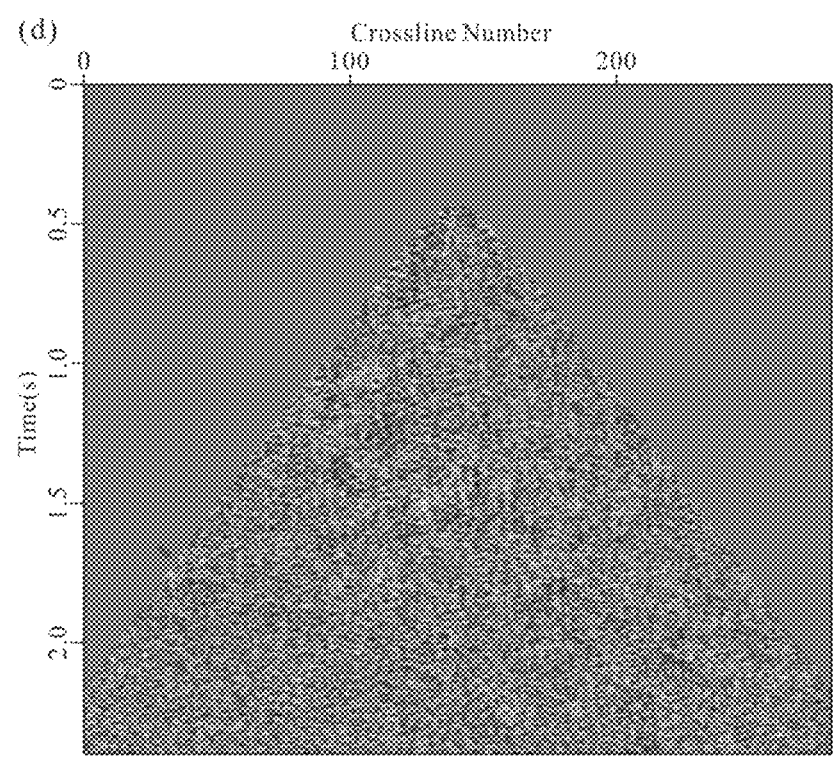
Figure 8A:
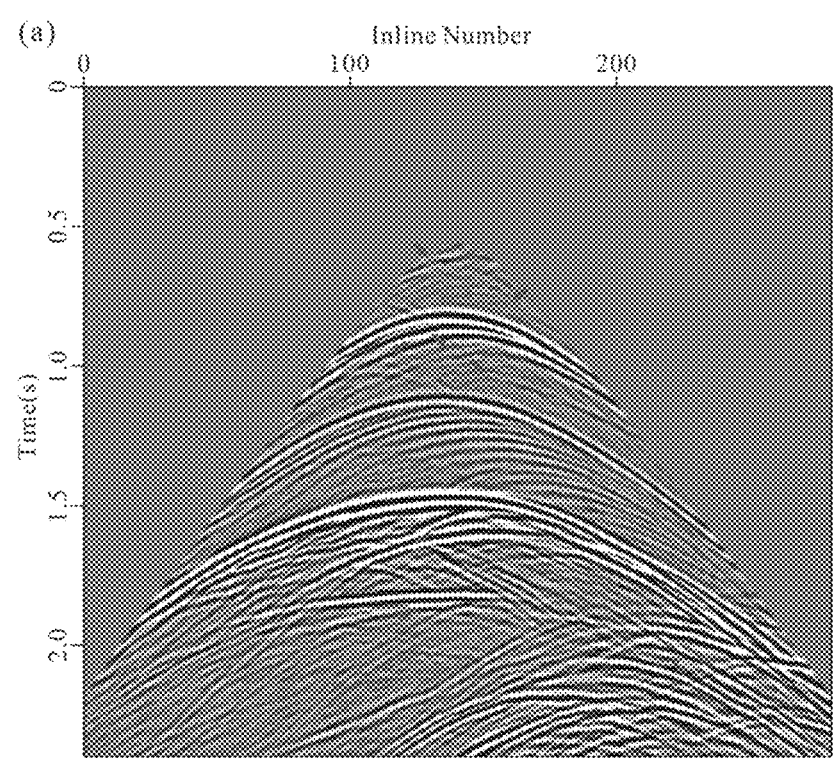
FIG. 8A, FIG. 8B, FIG. 8C, FIG. 8D are the data slice at position where the crossline number is 160.
Figure 8B:
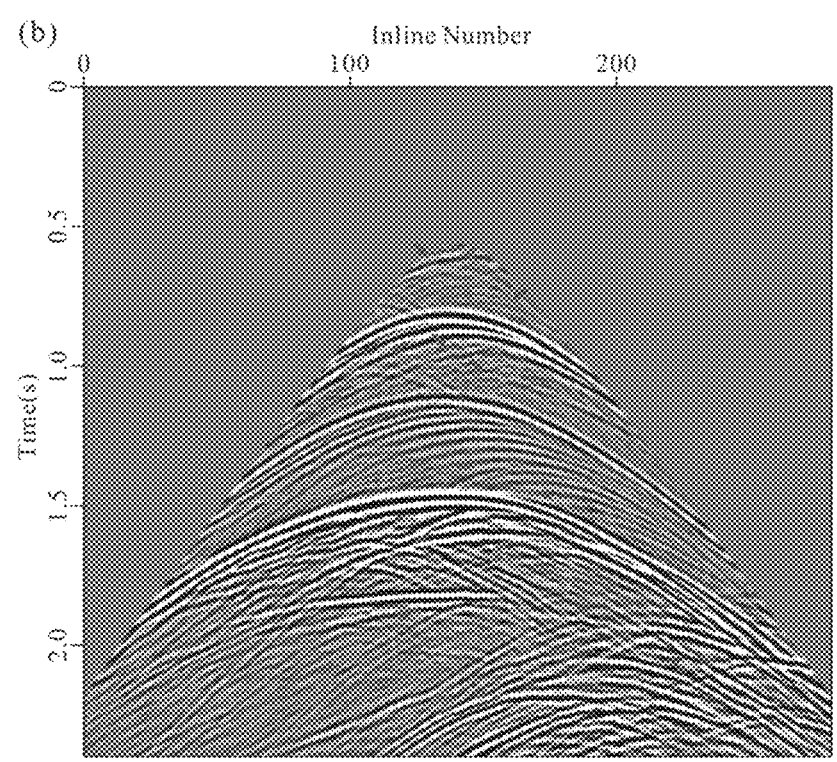
Figure 8C:
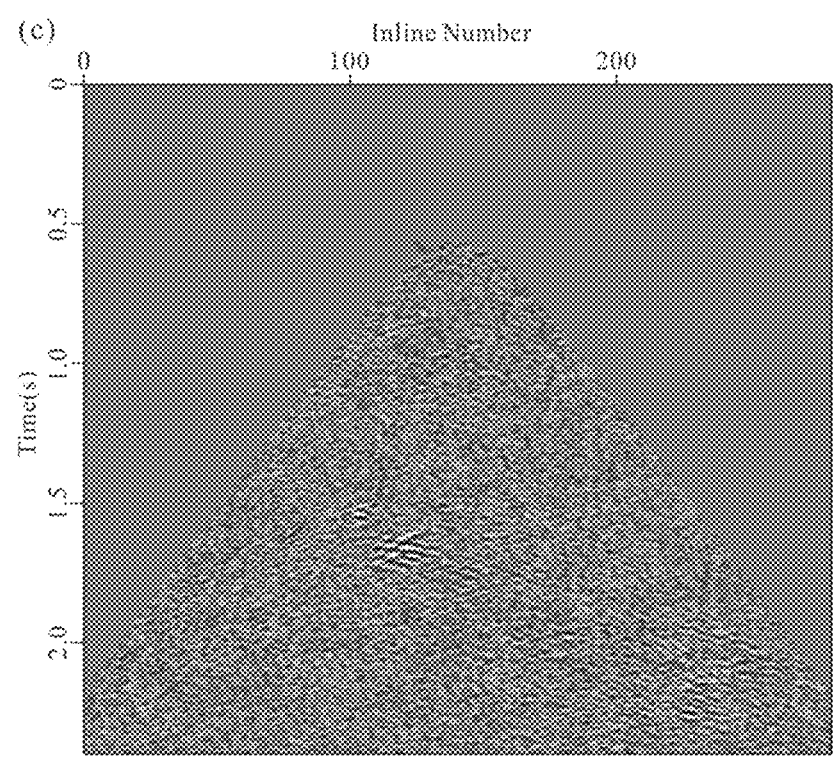
Figure 8D:
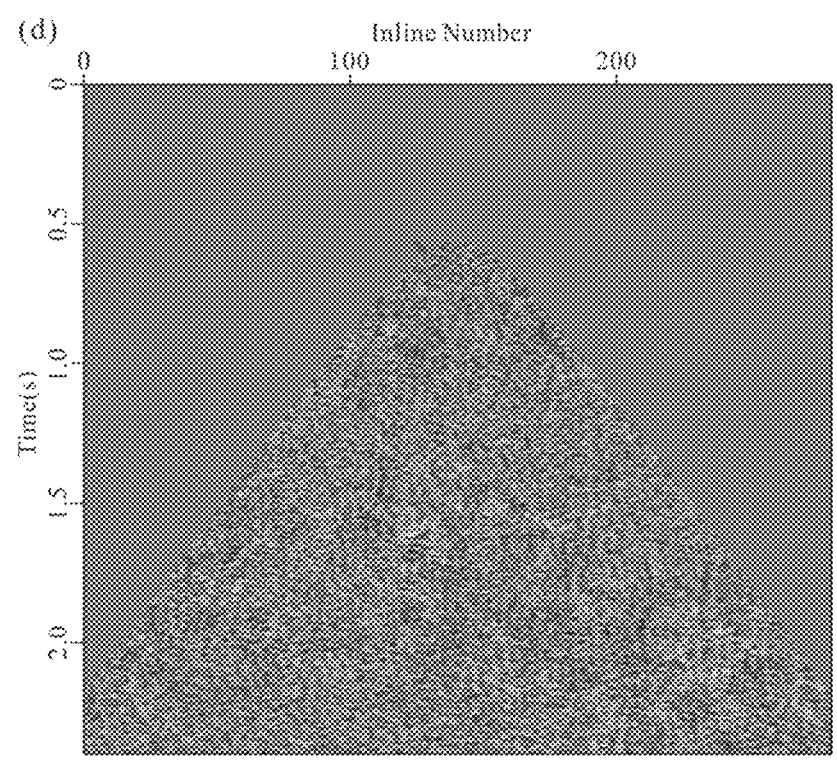
Figure 9A:
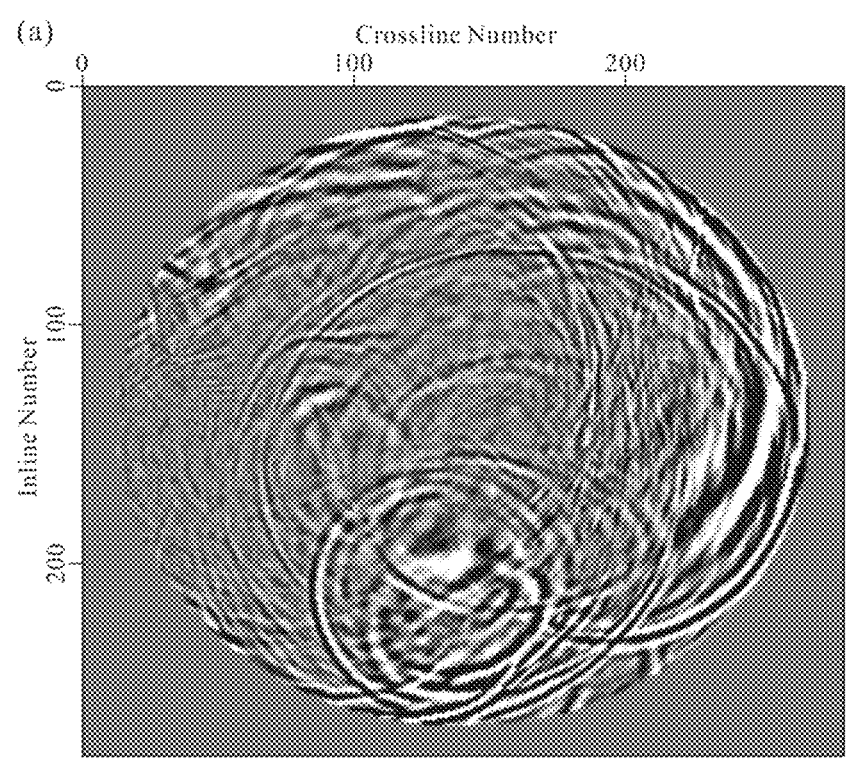
FIG. 9A, FIG. 9B, FIG. 9C, FIG. 9D are the data slice where the time is 0.2 s.
Figure 9B:
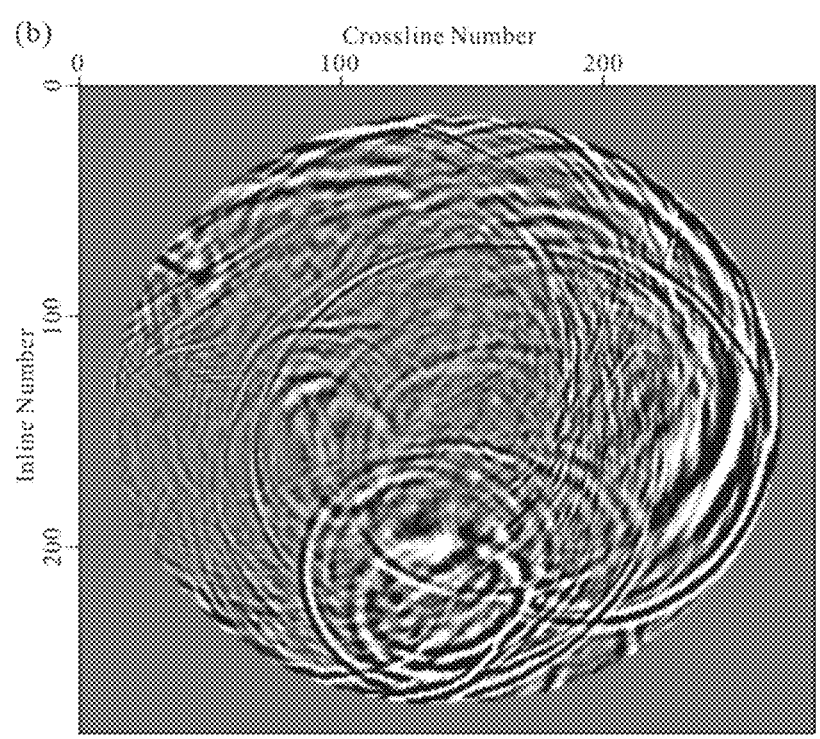
Figure 9C:
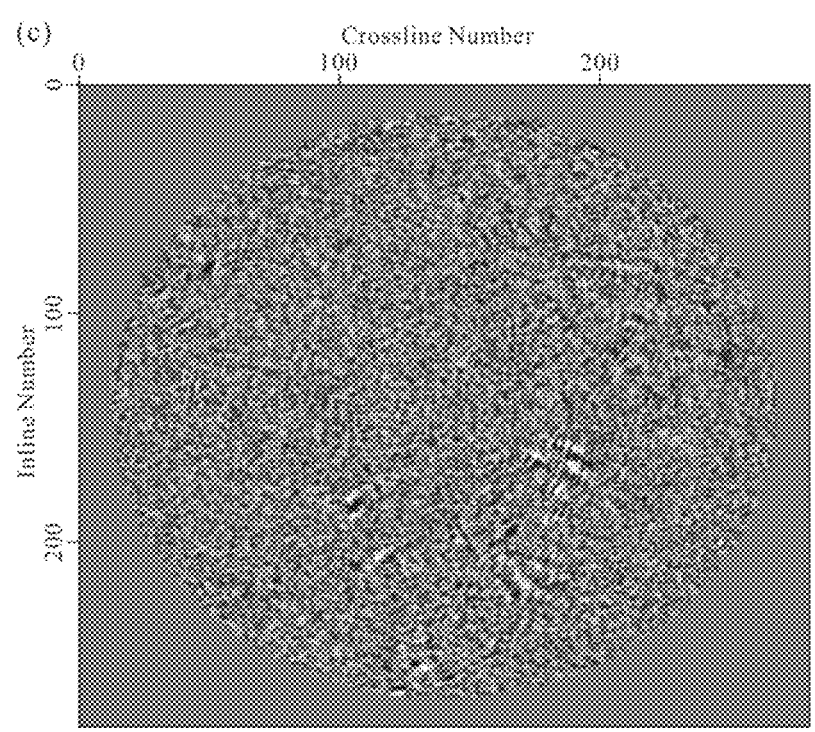
Figure 9D:
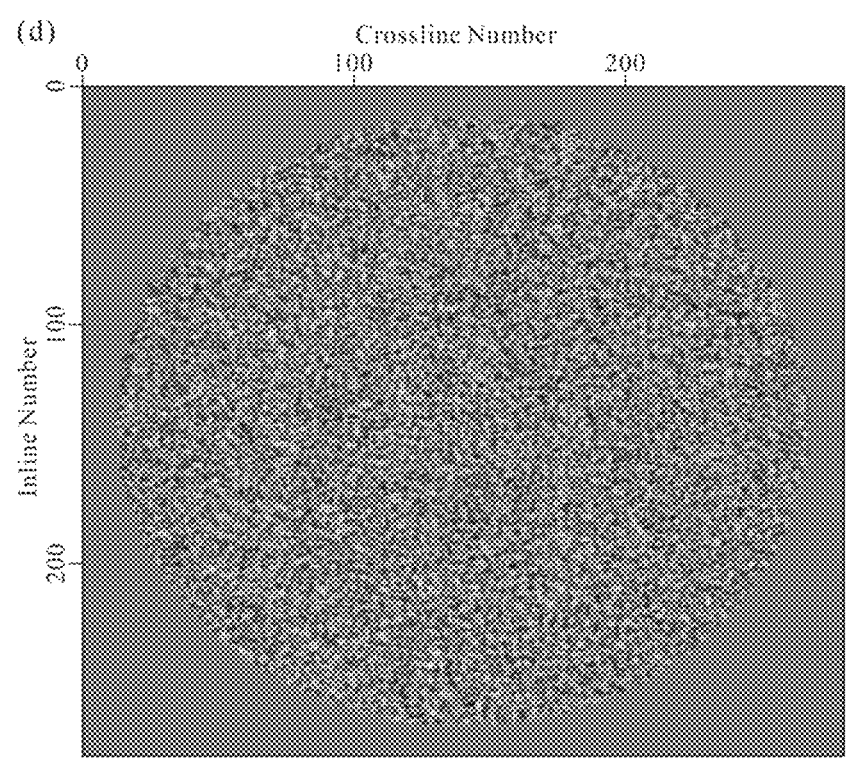

FIG. 6 is a three-dimensional Gaussian white noise seismic data with a signal-to-noise ration of 20 dB. The seismic data has very complicated wavefields due to the existence of the intersecting events. The dip angle-steering median filtering based on the iterative f-k method and on the niche differential evolution algorithm is adopted to suppress the noise. FIG. 7A is the filtering data slice of the dip angle-steering median filtering based on the iterative f-k method at the position where the inline number is 130, and FIG. 7B is the filtering data slice of the dip angle-steering median filtering based on the niche differential evolution algorithm at the position where the inline number is 130. FIG. 7C is the residual of FIG. 7A and its noisy data and FIG. 7D is the residual of FIG. 7B and its noisy data. FIG. 8A is the filtering data slice of the dip angle-steering median filtering based on the iterative f-k method at the position where the crossline number is 160, and FIG. 8B is the filtering data slice of the dip angle-steering median filtering based on the niche differential evolution algorithm at the position where the inline crossline is 160. FIG. 8C is the residual of FIG. 8A and its noisy data and FIG. 8D is the residual of FIG. 8B and its noisy data. FIG. 9A, FIG. 9B, FIG. 9C, FIG. 9D are the filtering data slices of the mentioned methods where the time is 0.2 s. FIG. 9C is the residual of FIG. 9A and its noisy data and FIG. 9D is the residual of FIG. 9B and its noisy data.

For the filtering results of the dip angle-steering median filtering based on the niche differential evolution algorithm, the event is well protected, and there is basically no coherent signal in the residual data. However, for the filtering results of the dip angle-steering median filtering based on the iterative f-k method, some coherent events have been leaked. For dip angle-steering median filtering based on the f-k method, the number of iterative filtering needs to be preset. When the number of dip angles of the event in the time-space window is less than the number of filtering times, additional noise will be introduced (FIG. 7A). For the dip angle-steering median filtering based on the niche differential evolution algorithm, the filtering times are adaptive. The dip angle-steering median filtering based on the niche differential evolution algorithm's ability to simultaneously obtain all the dip angles of intersecting events and the feature of the true three-dimension make it possible to obtain a better filtering effect than the dip angle-steering median filtering based on the iterative f-k method.

The dip angle-steering median filtering method based on a niche differential evolution algorithm does not need to calculate the apparent dip angle separately along the two spatial directions of the three-dimensional data, but directly obtains the true three-dimensional dip angle. Due to the randomness and intelligence of the niche differential evolution algorithm, compared to the local slant stack algorithm (in the case of three dimensions, the local slant stack algorithm should require uniform sampling along two spatial directions), niche differential evolution algorithm can obtain all the dip angles of intersecting events while obtaining higher computational efficiency. The niche differential evolution algorithm's ability to simultaneously obtain all the dip angles of intersecting events and the feature of the true three-dimension make it possible to obtain a better filtering effect.

The above embodiments are only used to illustrate the technical solution of the present disclosure, but not to limit the disclosure; Although the present disclosure has been described in detail with reference to the foregoing embodiments, those of ordinary skill in the art should understand: they can still possible to modify the technical solutions described in the foregoing embodiments, or equivalently replace some of the technical features; however, these modifications or replacements do not cause the essence of the corresponding technical solutions to deviate from the spirit and scope of the technical solutions in the embodiments of the present disclosure.

What is claimed is:

1. A dip angle-steering median filtering method based on a niche differential evolution algorithm; comprising the following steps:
   S1: dividing a data to be processed into a series of overlapping time-space windows;
   S2: obtaining an event energy curve in a time-space window and obtaining an event position according to a local maximum value of an event energy curve;
   S3: obtaining event dip angles and coherence values of the event dip angles through the niche differential evolution algorithm at the event position;
   S4: filtering the event dip angles according to the event dip angles and the coherence values of the event dip angles; and
   S5: performing a median filtering sequentially along a filtering dip angle.

2. The dip angle-steering median filtering method based on the niche differential evolution algorithm according to claim 1, further comprising the following step:
   S6: storing a median filtering data in the time-space window.

3. The dip angle-steering median filtering method based on the niche differential evolution algorithm according to claim 2; further comprising the following step:
   S7: determining whether a data to be analyzed in each the time-space window has been processed;
   if the data to be analyzed in each the time-space window has been processed, returning to S2 and the steps after S2;
   if the data to be analyzed in each the time-space window has not been processed, accumulating the median filtering data in all time-space windows.

4. The dip angle-steering median filtering method based on the niche differential evolution algorithm according to claim 1, obtaining the event energy curve in the time-space window in S2, comprising:
   applying a formula $E(t,x_0,y_0)=\Sigma_{j=-H/4}^{H/4}\Sigma_{i=-H/4}^{H/4}\Sigma_{k=-T}^{T}|d(t+k,i+x_0,j+y_0)|\varphi(i,j)\exp(-\phi k^2)$,
   determining the local maximum value of the event energy curve, and identifying the event position according to the local maximum value of the event energy curve;
   wherein, if $\sqrt{i^2+j^2} \leq H/4$, and $$\varphi(i,j) = \sin(\frac{\pi}{2}(1 - \frac{\sqrt{i^2+j^2}}{H/4}))^q;$$

otherwise, $\varphi(i,j)=0$;
   E is an event energy of the time-space window, t is a calculation time position, H is a space width of the time-space window, d is the data to be analyzed, T is a half width of an energy calculation range, $\phi$ is a constant greater than or equal to 1, a value of $x_0$ is $$\frac{H}{4}, \frac{H}{2} \text{ or } \frac{3H}{4}$$

and a value of $y_o$ is $$\frac{H}{4}, \frac{H}{2} \text{ or } \frac{3H}{4};$$

q is a constant greater than or equal to 1.

5. The dip angle-steering median filtering method based on the niche differential evolution algorithm according to claim 1, the niche differential evolution algorithm, comprising: a neighborhood-based crowding differential evolution algorithm, a hill-valley detection function and a Nelder-Mead simplex algorithm;
   the neighborhood-based crowding differential evolution algorithm is used to drive local solutions moving towards the respective local optima;

the hill-valley detection function is used to obtain local excellent solutions from the local solutions; and the Nelder-Mead simplex algorithm is used to improve the accuracy of the local excellent solutions;

the neighborhood-based crowding differential evolution algorithm, comprising the following steps:

S31: generating N initial units randomly;

S32: browsing each of the initial units;

finding the most similar m units to form a subpopulation;

S33: using a mutation and a crossover operation of the differential evolution algorithm in the subpopulation, and generating an experimental sub-unit;

S34: calculating a Euclidean distance of the experimental sub-unit and other units in an entire population;

S35: comparing a coherence value of an experimental sub-unit with that of the unit with a closet Euclidean distance, if the coherence value of the experimental sub-unit is smaller, then replacing the unit with the closet Euclidean distance with the experimental sub-unit; and S36: repeating S32-S35 M times until the neighborhood-based crowding differential evolution algorithm terminates, and M is a maximum number of an iteration.

6. The dip angle-steering median filtering method based on the niche differential evolution algorithm according to claim 5, wherein, the hill-valley detection function is used to determine whether any two local solutions belong to a same niche, comprising the following steps:

S37: sampling between any two local solutions, and obtaining the coherence values of interior dip angle samples between the two local solutions;

S38: if the coherence value of any of the interior dip angle samples is greater than a coherence value of the two local solutions, and then determining the two local solutions belong to different niches;

if the coherence value of any of the interior dip angle samples is smaller than the coherence value of the two local solutions, and then determining the two local solutions belong to a same niche; and S39: obtaining the local excellent solutions from the local solutions.

7. The dip angle-steering median filtering method based on the niche differential evolution algorithm according to claim 6, wherein: the Nelder-Mead simplex algorithm is used to improve the accuracy of the local excellent solutions, comprising the following steps:

S310: constructing a simplex with n+1 vertices around a single local excellent solution, n is a dimension of the single local excellent solution; sorting and relabeling the n+1 vertices as $x_1, x_2, \ldots, x_{n+1}$, and letting $f(x_1) \leq f(x_2) \leq \ldots \leq f(x_{n+1})$; since a goal is to minimize f, therefore, in an example of the present disclosure, $x_1$ is a best vertex and $x_{n+1}$ is a worst vertex;

S311: according to $$x_r = x_o + \rho(x_o - x_{n+1})$$

calculating a reflection point $x_r$, in the formula, $x_o$ is a centroid of n best points, $$x_o = \frac{\sum_{i=1}^{n} x_i}{n};$$

calculating $f(x_r)$, if $f(x_1) \leq f(x_r) < f(x_n)$, and then replacing $x_{n+1}$ with the reflection point $x_r$ and going to S316;

S312: if $f(x_r) < f(x_1)$, according to $x_e = x_o + \chi(x_r - x_o)$ calculating an expansion point $x_e$ and $f(x_e)$; if $f(x_e) < f(x_r)$, and replacing $x_{n+1}$ with $x_e$ and going to S316, otherwise, replacing $x_{n+1}$ with $x_r$ and going to S316;

S313: if $f(x_n) \leq f(x_r) < f(x_{n+1})$, performing an outside contraction, according to $x_{oc} = x_o + \gamma(x_r - x_o)$;

calculating an outside contraction point $x_{oc}$ and $f(x_{oc})$; if $f(x_{oc}) \leq f(x_r)$, replacing $x_{n+1}$ with $x_{oc}$ and going to S315;

S314: if $f(x_r) \geq f(x_{n+1})$, performing an inside contraction, according to $x_{ic} = x_o + \gamma(x_{n+1} - x_o)$;

calculating an inside contraction point $x_{ic}$ and $f(x_{ic})$; if $f(x_{ic}) \leq f(x_{n+1})$, replacing $x_{n+1}$ with $x_{ic}$ and going to S316, otherwise, going to S315;

S315: calculating $f(x'_i)$ at n new points $x'_i = x_1 + \gamma(x_i - x_1)$, i=2, . . . , n+1, and replacing vertexes $x_2, \ldots, x_{n+1}$ with $x'_2, \ldots, x'_{n+1}$; and S316: sorting and relabeling the n+1 vertices of a new simplex as $x_1, x_2, \ldots, x_{n+1}, f(x_1) \leq f(x_2) \leq \ldots \leq f(x_{n+1})$; if $$\left[\sum_{i=1}^{n+1} \frac{(f(x_i) - f(x_o))^2}{n+1}\right]^{\frac{1}{2}} < \varepsilon \ (\varepsilon > 0$$

is a predetermined threshold), or achieving the maximum number of an iteration, and then stopping, otherwise, going to S311.

8. The dip angle-steering median filtering method based on the niche differential evolution algorithm according to claim 7, wherein, in S4, filtering the event dip angles according to the event dip angles and the coherence values of the event dip angles, comprising:

S41: setting an event dip angle threshold $\delta$;

S42: for k obtained event dip angles, $p_1, p_2, \ldots, p_k$ and the corresponding coherence values of the event dip angles, $f_1, f_2, \ldots, f_k$, and for any two event dip angles $p_o$ and $p_q$, calculating $\|p_i - p_j\|_2$; and S43: removing the event dip angle with a larger coherence value if $\|p_i - p_j\|_2 < \delta$;

wherein, o and q are integers greater than 0, and o≠q, o≤k, and q≤k.

* * * * *